US011064168B1

(12) United States Patent
Beach

(10) Patent No.: US 11,064,168 B1
(45) Date of Patent: Jul. 13, 2021

(54) VIDEO MONITORING BY PEEP HOLE DEVICE

(71) Applicant: ObjectVideo Labs, LLC, Tysons, VA (US)

(72) Inventor: Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 16/148,066

(22) Filed: Oct. 1, 2018

Related U.S. Application Data

(60) Provisional application No. 62/565,738, filed on Sep. 29, 2017.

(51) Int. Cl.
| *H04N 7/18* | (2006.01) |
| *H04N 5/232* | (2006.01) |
| *H04N 5/225* | (2006.01) |

(52) U.S. Cl.
CPC ........... *H04N 7/188* (2013.01); *H04N 5/2253* (2013.01); *H04N 5/23293* (2013.01); *H04N 7/183* (2013.01)

(58) Field of Classification Search
CPC .. H04N 7/186; H04N 7/188; G08B 13/19656; G08B 13/19684; G05B 2219/2642
See application file for complete search history.

(56) References Cited

U.S. PATENT DOCUMENTS

| 4,894,858 | A | * | 1/1990 | Collingwood | ...... | H04M 1/0291 |
| | | | | | | 379/110.01 |
| 7,012,523 | B2 | * | 3/2006 | Stuart | ..................... | H04N 7/186 |
| | | | | | | 340/540 |
| 7,746,223 | B2 | * | 6/2010 | Howarter | ................. | G08B 3/10 |
| | | | | | | 340/13.31 |
| 8,619,136 | B2 | * | 12/2013 | Howarter | ............. | G08B 13/196 |
| | | | | | | 340/328 |
| 9,619,955 | B2 | * | 4/2017 | Eichenblatt | .......... | A47G 29/141 |
| 9,781,348 | B1 | * | 10/2017 | Bart | ....................... | H04N 7/183 |
| 10,138,672 | B2 | * | 11/2018 | Hoyda | ................ | G03B 17/565 |
| 10,255,737 | B1 | * | 4/2019 | Eichenblatt | ........ | G07C 9/00158 |
| 10,393,590 | B2 | * | 8/2019 | Fadell | ................ | G06K 9/00369 |
| 10,402,643 | B2 | * | 9/2019 | James | ................ | G06K 9/00771 |
| 10,692,340 | B2 | * | 6/2020 | Seelman | ............. | G08B 29/188 |
| 10,728,497 | B2 | * | 7/2020 | Siminoff | ................ | G08B 25/10 |
| 10,915,758 | B1 | * | 2/2021 | Trundle | .......... | G08B 13/19684 |
| 2003/0095185 | A1 | * | 5/2003 | Naifeh | ................... | H04N 7/185 |
| | | | | | | 348/156 |

(Continued)

*Primary Examiner* — Brian P Yenke
(74) *Attorney, Agent, or Firm* — Fish & Richardson P.C.

(57) ABSTRACT

An electronic peep hole device includes a first portion that is configured to be mounted to an exterior side of a front door of a monitored property, the first portion includes a user interface and a camera that is configured to capture image data, a second portion that is configured to be mounted to an interior side of the front door of the monitored property, the second portion includes a display unit that is configured to display the image data captured by the camera, and a connecting portion that is configured to connect the first portion to the second portion through a hole in the surface of the front door, the connecting portion being configured to house an electrical connection between the first portion and the second portion.

19 Claims, 3 Drawing Sheets

(56) References Cited

U.S. PATENT DOCUMENTS

| | | | |
|---|---|---|---|
| 2006/0250230 A1* | 11/2006 | Fischer | B60R 25/1004 340/500 |
| 2007/0090944 A1* | 4/2007 | Du Breuil | H04N 7/181 340/531 |
| 2008/0079442 A1* | 4/2008 | Posamentier | G06K 9/0002 324/605 |
| 2008/0298795 A1* | 12/2008 | Kuberka | G03B 17/18 396/263 |
| 2009/0091618 A1* | 4/2009 | Anderson | B60R 1/00 348/143 |
| 2009/0273670 A1* | 11/2009 | Tamayo | H04N 7/186 348/143 |
| 2009/0302995 A1* | 12/2009 | Park | G07C 9/38 340/3.1 |
| 2011/0121940 A1* | 5/2011 | Jones | H04N 7/186 340/5.7 |
| 2012/0001755 A1* | 1/2012 | Conrady | H04N 7/186 340/540 |
| 2012/0072032 A1* | 3/2012 | Powell | F24F 11/30 700/278 |
| 2012/0113253 A1* | 5/2012 | Slater | H04N 7/185 348/143 |
| 2012/0182382 A1* | 7/2012 | Serramalera | H04N 7/147 348/14.07 |
| 2012/0313779 A1* | 12/2012 | Papaefstathiou | G05D 1/0274 340/540 |
| 2013/0045763 A1* | 2/2013 | Ruiz | H04M 1/0291 455/466 |
| 2014/0139666 A1* | 5/2014 | Wei | H04N 5/23245 348/143 |
| 2014/0161316 A1* | 6/2014 | Golan | G06K 9/00261 382/103 |
| 2015/0009062 A1* | 1/2015 | Herthan | E05B 83/16 342/70 |
| 2015/0124091 A1* | 5/2015 | Stahl | H04N 7/183 348/143 |
| 2015/0241860 A1* | 8/2015 | Raid | H05B 47/105 700/275 |
| 2016/0050399 A1* | 2/2016 | Chuter | H04N 7/186 348/155 |
| 2016/0156767 A1* | 6/2016 | Rezanezhad Gatabi | H04M 1/72533 455/420 |
| 2016/0182249 A1* | 6/2016 | Lea | H04N 21/4131 725/80 |
| 2016/0189532 A1* | 6/2016 | Malhotra | G08B 25/008 340/506 |
| 2016/0232763 A1* | 8/2016 | Sockol | G08B 13/19619 |
| 2016/0247027 A1 | 8/2016 | Tsoi et al. | |
| 2016/0247344 A1* | 8/2016 | Eichenblatt | A47G 29/141 |
| 2016/0261425 A1* | 9/2016 | Horton | G05D 23/1917 |
| 2017/0299696 A1* | 10/2017 | Fuller | G01S 7/003 |
| 2017/0300760 A1* | 10/2017 | Ellerhold | G06K 9/2063 |
| 2017/0302892 A1* | 10/2017 | Ellerhold | H04N 5/2256 |
| 2017/0359423 A1* | 12/2017 | Nadathur | H04L 67/146 |
| 2017/0361807 A1* | 12/2017 | Dellock | B60R 25/016 |
| 2018/0001474 A1* | 1/2018 | Sinyavskiy | B60W 30/09 |
| 2018/0120466 A1* | 5/2018 | Aponte Luis | G01V 3/12 |
| 2019/0236342 A1* | 8/2019 | Madden | G06K 9/00228 |
| 2019/0340904 A1* | 11/2019 | Yuan | G07C 9/00896 |
| 2020/0040649 A1* | 2/2020 | Harvey | H04N 5/2257 |
| 2020/0394882 A1* | 12/2020 | England | H04N 7/186 |
| 2021/0034882 A1* | 2/2021 | Johnson | G06K 9/00771 |

\* cited by examiner

VIDEO MONITORING BY PEEP HOLE DEVICE

CROSS REFERENCE TO RELATED APPLICATION

This application claims benefit of U.S. Provisional Application No. 62/565,738, filed Sep. 29, 2017, and titled "Video Monitoring by Peep Hole Device," which is incorporated by reference in its entirety.

TECHNICAL FIELD

This disclosure relates to property monitoring technology.

BACKGROUND

Home monitoring systems include several electronic components including sensors and appliances that may communicate with each other via a communication network to facilitate a smart home ecosystem.

SUMMARY

Techniques are described for monitoring technology. For example, techniques are described for integrating an in-home monitoring system with a peep hole device to support digital peep hole functionality.

According to an innovative aspect of the subject matter described in this application, an electronic peep hole device includes a first portion that is configured to be mounted to an exterior side of a front door of a monitored property, the first portion including a user interface and a camera that is configured to capture image data, a second portion that is configured to be mounted to an interior side of the front door of the monitored property, the second portion including a display unit that is configured to display the image data captured by the camera, and a connecting portion that is configured to connect the first portion to the second portion through a hole in the surface of the front door, the connecting portion being configured to house an electrical connection between the first portion and the second portion.

These and other implementations each optionally include one or more of the following features. The first portion further includes a doorbell button. The camera of the first portion includes a processor, and the camera of the first portion is configured to capture image data in response to a visitor pressing a door bell button of the device. The first portion includes a motion sensor that is configured to detect motion in the vicinity of the front door of the property. The camera of the first portion includes a processor, and the camera of the first portion is configured to capture image data in response to detecting motion in the vicinity of the front door of the property.

The camera of the first portion includes a light sensitive sensor that is configured to detect a human form object in the vicinity of the front door of the property, and the camera of the first portion is configured to capture image data in response to detecting a human form object in the vicinity of the front door of the property. The camera of the first portion includes a light sensitive sensor that is configured to detect a non-human form object in the vicinity of the front door of the property, and the camera of the first portion is configured not to capture image data in response to detecting a non-human form object in the vicinity of the front door of the property. The user interface of the first portion includes a keypad, a microphone, and a speaker.

The microphone is configured to receive voice data from a visitor in the vicinity of the front door of the property. At least one of the first portion and the second portion includes a battery. The second portion includes a wireless radio that is configured to transmit one or more of a short wave communication, a cellular communication, or a Wi-Fi communication. The wireless radio of the second portion is configured to communicate with a monitor control unit. The first portion is configured to be removably connected to the surface of the exterior of the front door, and is mounted over the hole in the surface of the door. The first portion is configured to adhere to the surface of the exterior of the front door.

The first portion includes a vibration sensor that is configured to detect knocking on the front door of the property, and the camera of the first portion is configured to capture image data in response to detecting knocking on the front door of the property. The second portion includes a camera. The second portion is configured to be removably connected to the surface of the interior of the front door, and is mounted over the hole in the surface of the door. The second portion is configured to adhere to the surface of the interior of the front door. The electrical connection between the first portion and the second portion is a removably pluggable wire. The connecting portion is a flexible cylindrical tube that is removably coupled to each of the first portion and the second portion.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for using a peep hole device to provide video monitoring for a property. In some implementations, the peep hole device may integrate into a monitoring system. The peep hole device may include a camera, a microphone, and a speaker, all integrated into a single device that is mounted to a front door at the monitored property. The peep hole device may include a button that serves as a doorbell. When a visitor arrives at the monitored property and presses the doorbell button on the peep hole device, the camera of the peep hole device may begin to capture video and or image data that is communicated to a control unit of the monitoring system. The control unit may communicate the captured video data to a user device of a resident of the monitored property for the user to see the visitor at the front door.

The peep hole device may be used as a simple low cost security solution for dwellers. The peep hole device may be portable which allows users to move with the device from one home to the next, and may be ideal for renters within an apartment building. The peep hole device may be mounted to the entry door to the apartment to monitor the front entrance for visitors. The peep hole device may also be used to count the number of persons entering and or exiting an apartment. For example, at an assisted living facility, the peep hole device may be used to keep a tally of the occupants, or timing of nurse visits. The peep hole device may be very small, and may be affixed to the existing hole through a spring based system that holds the peep hole device in place over the hole. The peep hole device may be used by persons who rent an apartment, or person who are not permitted to make modifications to the door. For example, persons who may have a home owner's association (HOA) that does not permit changes to the front door. The peep hole device may be installed on the door of a hotel room.

The peep hole device may be mounted to the door using the pre-existing peep hole, with no modifications required to the door. For example, the peep hole device may be used by residents that are renting a property, when the renters are leaving the property, the device may be removed from the door.

Figure 1:
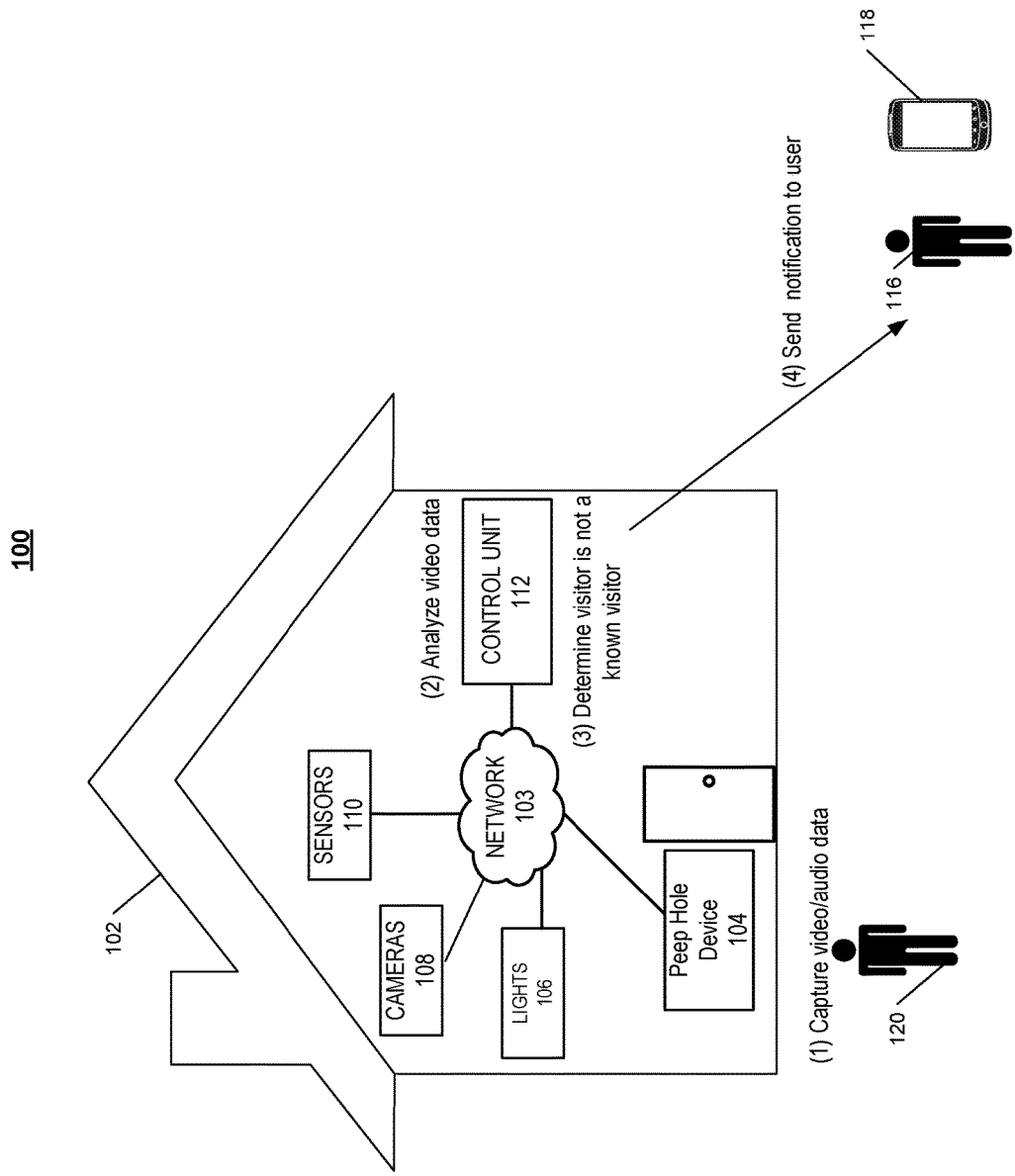
FIG. 1 illustrates an example of a system for monitoring a property.

FIG. 1 illustrates an example of a monitoring system 100 integrated with a peep hole device 104. As shown in FIG. 1, a property 102 (e.g. a home) of a user 116 is monitored by an in-home monitoring system (e.g. in-home security system) that includes components that are fixed within the property 102. The in-home monitoring system may include a control unit 112, one or more sensors 110, one or more cameras 108, one or more lights 106, and a peep hole device 104.

In the example illustrated in FIG. 1, a visitor 120 approaches the front door of the monitored property 102. The visitor 120 may press the doorbell button, which may be located on the external interface of the peep hole device 104. The external interface of the peep hole device 104 may include the doorbell button, a speaker, a microphone, and a camera lens. The all in one peep hole device 104 may replace an existing peep hole on the front door. The wiring for the device may run through the physical hole formed by the existing peep hole, and the camera, speaker, and microphone components form an interface on the exterior surface of the front door. The interior surface of the peep hole device 104 may include a video screen that displays a video stream of the live video captured by the peep hole device 104. The camera of the peep hole device 104 begins to capture video and image data when the visitor presses the doorbell button.

In some implementations, where one or more motion detectors are located near the front door on the monitored property, at least one motion detector may detect motion near the door and may communicate with the control unit 112. When the control unit 112 receives communication from at least one motion detector, the control unit 112 prompts the peep hole device 104 to capture video and or image data of the surroundings. The control unit 112 may simultaneously prompt one or more lights near the front door of the property to switch on to provide light for the camera of the peep hole device 104. In some examples, the camera of the peep hole device 104 may include a PIR sensor configured to detect the heat radiated from living objects. When the PIR sensor within the peep hole device 10 detects heat radiated from a living object, the device 104 may initiate the capture of video and image data of the surroundings. In some examples, in response to the PIR sensor detecting motion, the camera of the peep hole device 104 begins to capture video.

In some implementations, the camera of the peep hole device 104 may include a light sensitive sensor that is configured to distinguish between a human form and an animal form based on the configuration of light striking the surface of the light sensor. The peep hole device 104 may be configured to initiate the capture of video and image data when the light sensor detects a human form near the front door. In some implementations, the monitored property may be equipped with a sensor that is configured to recognize the sound generated when a visitor knocks on the front door. In response to the sensor detecting sound generated by a knock, the peep hole device may begin to capture video. In some implementations, in response to a vibration sensor detecting a sequence of knocks on the front door, the camera of the peep hole device begins to capture video data.

In some implementations, the exterior interface of the peep hole device 104 may include a talk button that when pressed by the visitor 120 initiates two-way communication. The peep hole device 104 may simultaneously begin to capture video and or image data of the visitor when the visitor presses the talk button. The visitor may press the talk button to initiate two-way communication with the speaker on the interior interface of the peep hole device 104. For example, the visitor may press the talk button and the user 116 within the property may respond to the visitor. In examples where the user 116 is not within the monitored property 102, the two-way communication may be initiated by the user 116 with the user's device 117. For example, when the in-home monitoring system is armed away, the control unit 112 may assume that none of the residents are within the property, and may prompt the peep hole device 104 to initiate the two-way communication with the user device 118. In some implementations, when the visitor presses the talk button on the exterior interface of the peep hole device 104 the device initiates a video call with the user's device 118. The visitor 120 may have the option to leave a video and or audio message through the peep hole device 104.

The video and image data captured by the peep hole device 104 may be communicated to the control unit 112. The control unit 112 may analyze the received data to determine whether the visitor 120 is a known or unknown person. The control unit 112 may be configured to store one or more images of known visitors. A known visitor is a visitor who may have visited the monitored property 102 in the past. For example, a friend of the user 116 may have approached the peep hole device 104 in the past, and the camera of the peep hole device 104 captured one or more images of the friend. Based on the user 116 allowing the friend access to the monitored property, the control unit 112 may store the image of the friend as a known visitor. In some implementations, the user 116 may identity a list of one or more known visitors through a monitoring application running on the user's device 118. The user 116 may log into the monitoring application to provide the known visitors and may provide one or more images of each of the known visitors. Based on comparing the capture video and image data to the image data of the known visitors, the control unit 112 may determine that the visitor 120 is not a known visitor.

The control unit 112 may send a notification to the user device 118 of the user 116 indicating that an unknown visitor is at the front door. The notification may include a captured image of the visitor 120. In some examples, the notification may include an option for the user 116 to initiate two-way communication with the visitor 120. When the user 116 selects the option, the user 116 may communicate with the visitor to determine the reason for their visit. When the user 116 is within the property 102, the user may unlock the front door to allow the visitor into the property. The user 116 may also unlock the front door of the property through the monitoring application on the user device 118. The front door may be equipped with a smart lock that can be unlocked through the monitoring application. The peep hole device 104 may be configured to detect the opening and closing events of the front door of the monitored property. The opening and closing events may be logged in memory at the control unit 112. The control unit 112 may log the entry and exit times for each of the one or more known visitors. The logged data may be communicated to the user device 118 of the user 116.

The control unit 112 may use video analytics to determine whether a visitor at the front door is a delivery person or a service worker. The video data captured by the peep hole device 104 over time may be analyzed by the control unit 112 to detect patterns within the behaviors of visitors such as a delivery person. For example, the control unit may determine a visitor that rings the door bell and subsequently leaves an item at the foot of the door is a delivery person. The video analytics techniques used by the control unit to make the determinations may include object detection used to identify logos, or to detect a delivery truck near the home. The control unit 112 may send a notification to the user device 118 of the user 116 when the control unit determines a delivery person delivered a packed.

Figure 2:
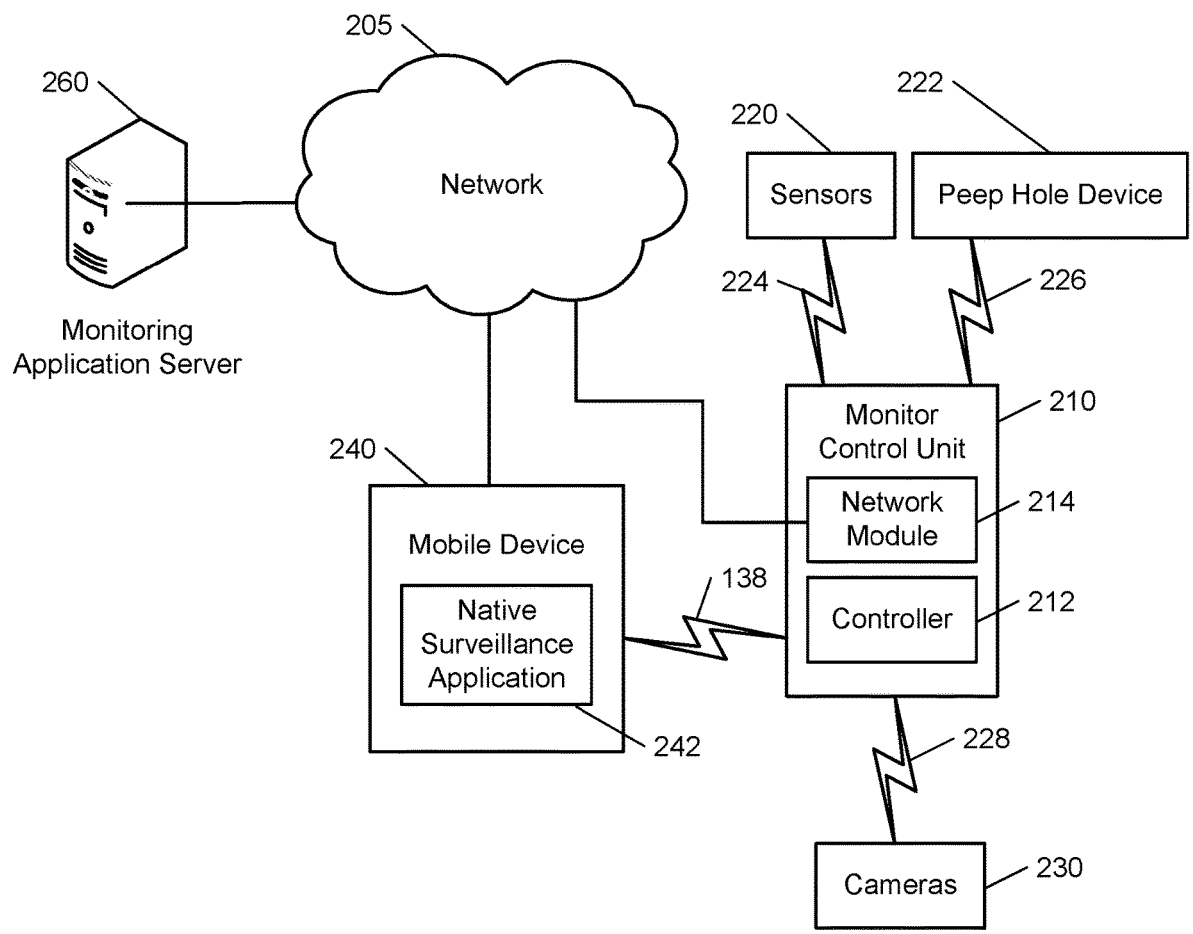
FIG. 2 illustrates an example of a monitoring system integrated with a peep hole device.

FIG. 2 illustrates an example of a system 200 configured to monitor a property. The system 200 includes a network 205, a monitoring system control unit 210, one or more user devices 240, a monitoring application server 260, and a central alarm station server 270. The network 205 facilitates communications between the monitoring system control unit 210, the one or more user devices 240, the monitoring application server 260, and the central alarm station server 270. The network 205 is configured to enable exchange of electronic communications between devices connected to the network 205. For example, the network 205 may be configured to enable exchange of electronic communications between the monitoring system control unit 210, the one or more user devices 240, the monitoring application server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from indoor door knobs, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include a peep hole device 222. The peep hole device may include a camera, a microphone, and a speaker. The peep hole device may be in communication with the monitor control unit 210. In some implementations, the peep hole device may communicate with the monitor control unit 210 through Zwave, Zigbee, BLE, LoRA, LPWan, GSM, CDMA, LTE, Wi-Fi, Powerline, PoE, Ethernet, other wireline, proprietary 900 Mhz/2.4 Gz/other radio frequency, or any other suitable method of communication.

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The one or more cameras 230 may be triggered by several different types of techniques. For instance, a Passive Infra Red (PIR) motion sensor may be built into the one or more cameras 230 and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 214, etc.) to improve image quality when the scene is dark. An integrated or separate light sensor may be used to determine if illumination is desired and may result in increased image quality.

The sensors 220, the light/camera devices 222, and the cameras 230 communicate with the controller 212 over communication links 224, 226, and 228. The communication links 224, 226, and 228 may be a wired or wireless data pathway configured to transmit signals from the sensors 220, the light/camera devices 222, and the cameras 230 to the controller 212. The communication link 224, 226, and 228 228 may include a local network, such as, 802.11 "Wi-Fi" wireless Ethernet (e.g., using low-power Wi-Fi chipsets), Z-Wave, Power Over Ethernet (POE), Zigbee, Bluetooth, "HomePlug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 140 to receive and process image and sensor data from the monitoring system.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bolt, Lora, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication.

Figure 3:
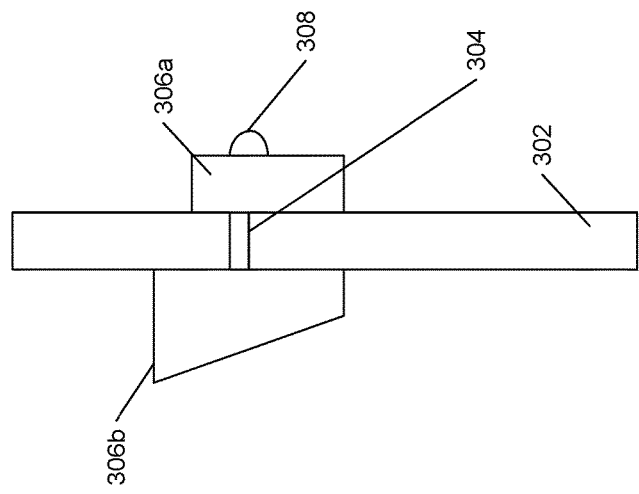
FIG. 3 is an example of a peep hole device.
Figure 3:
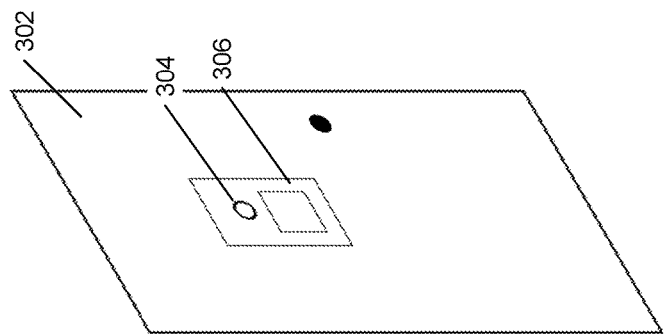

FIG. 3 illustrates an example of a peep hole device. The peep hole device 306 may be mounted to a door 302 that has an existing physical peep hole 304. The wiring for the camera and the other electrical components of the peep hole device are configured to run through the physical hole 304 to both the first portion 306a and the second portion 306b of the peep hole device. The components of the existing peep hole are removed from the physical hole 304, and the electrical components of the peep hole device are fit into the physical hole 304. In some implementations, the electrical wiring is connected to an electrical outlet to provide power to the peep hole device 104. For example, the electrical wiring may run along the hinge of the interior side of the door and connect to an electrical outlet near the door. In other implementations, the first portion 306a or the second portion 306b includes a battery that powers the peep hole device 306. The battery may be a rechargeable battery or may be a replaceable battery. In some implementations, the peep hole device 306 may be mounted to a door that does not have an existing physical peep hole. In these implementations, the small hole may be formed in the door to house the wiring of the peep hole device.

The peep hole device 306 may be a lightweight easy to install device. The first portion 306a and the second portion 306b may be connected by a pluggable wire to allow for the installation of the peep hole device 306. The pluggable wire that connects the first portion 306a and the second portion 306b together may be screwed together through the existing peep hole in the door. A user installing the peep hole device 306 may first mount the first portion 306a to the exterior of the door. The first portion 306a is affixed to the exterior surface of the door over to peep hole 304. The user may align the electrical wiring exiting the back portion of the first portion 306a with the peep hole 304. The user passes the electrical wiring through the peep hole, and connects the wires to the back portion of the second portion 306b. The second portion 306b is then affixed to the interior surface of the door 302. The first and second portions may be affixed to the surface of the door using an adhesive such as double sided tape. In some examples, the first and second portions may be affixed to the surface of the door using screws. In some implementations, the peep hole device may be a very small device that may be affixed to the existing peep hole. For example, the peep hole device may be mounted over the existing peep hole by a spring based system.

The peep hole device 306 may include one or more different wireless radios to facilitate communication with the control unit at the monitoring property. For example, the peep hole device may include a Wi-Fi radio, an LTE cellular radio, or a Z-wave radio. As illustrated in 300B, the peep hole device 306 includes a first portion 306a that is mounted to the exterior surface of the door 302, and a second portion 306b that is mounted to the interior surface of the door 302. The second portion 306b is mounted on the interior side of the door 302. The second portion 306b may include a screen that is configured to display the video data captured by camera of the peep hole device. The first portion 306a of the peep hole device includes a camera 308. The camera 308 of the peep hole device 306 may be configured to capture video and image data.

The first portion 306a of the peep hole device may include a user interface. The user interface may include a screen, a microphone, a speaker, or a door bell button. In some examples, the user interface may include a talk button that when pressed will initiate two-way communication with a resident of a property. The talk button may also be used to initiate a video call with the resident. In some implementations, the exterior interface of the peep hole device 306 may include a keypad that may be used to enter a code to unlock the door. The exterior interface of the peep hole device may include a sensor that can be used for electronic key access. For example, the interface may include an RFID reader to read an RFID tag.

In some implementations, an electronic peep hole device has a first portion that is configured to be mounted to an exterior side of a front door of a monitored property. For example, the first portion is configured to stick to the surface of the exterior of the front door over an original peep hole. The first portion of the peep hole device may include an adhesive material at the corners of the first portion. When the peep hole device is being set up by a resident of the monitored property, the user may remove a protective strip over the adhesive material, and place the first portion on the surface of the exterior of the front door. In other examples, the resident of the property may use double-sided tape to adhere the first portion of the device to the surface of the exterior portion of the front door. In yet another example, the first portion of the device may include one or more screws that each screw into the surface of the exterior of the front door. In some examples, the first portion of the device includes a magnetic strip, that may be used to mount the first portion of the device on the door when the front door is metal. The first portion of the peep hole device may be rectangular in shape.

The front portion of the peep hole device may include a user interface and a camera that is configured to capture image data. For example, the first portion of the peep hole device includes an LCD screen as a user interface. In some examples, the camera may be built into the user interface, and in other examples the camera may be a stand alone camera located on the first portion of the peep hole device. The user interface may include a keypad, a microphone, and a speaker. A visitor may initiate two-way conversation using the user interface. The visitor may communicate with a resident of the property that is inside the property.

The front portion of the peep hole device may also include a door bell button. For example, the user interface of the front portion may include an icon for a door bell button. In other examples, the door bell button is a physical button located on the first portion of the peep hole device. When a visitor arrives at the monitored property, the visitor may press the door bell button to notify a resident user of his arrival. The first portion of the door bell device may include a battery. For example, the first portion of the door bell may include a lithium battery. The battery may be a backup energy supply for the peep hole device. In some examples, where the peep hole device is not connected to an electrical connection at the property, the battery may be the primary energy source. The first portion of the peep hole device may include a motion sensor that is configured to detect motion in the vicinity of the front door of the property.

The camera of the first portion may include a processor and be configured to capture image data in response to a visitor pressing the door bell of the device. For example, the camera begins to capture image data when a visitor hits the door bell icon on the user interface. In some examples, the camera of the first portion is configured to capture image data in response to detecting motion by the motion sensor. The camera of the first portion may include a light sensitive sensor that is configured to detect a human form object in the vicinity of the front door of the property. The camera of the first portion may be configured to capture image data in response to the light sensitive sensor detecting a human form object in the vicinity of the front door of the property. The camera of the first portion may not capture image data when the light sensitive sensor detects a non-human for object in the vicinity of the front door of the property. In other examples, the camera of the first portion may include a PIR sensor that is configured to detect the heat that is radiated from living objects. The camera of the front portion may be configured to capture image data in response to the PIR sensor detecting heat radiating from a living object in the vicinity of the front door of the property.

The camera of the first portion may be configured to detect when the front door is opened. For example, when the camera detects that there is a change in the view captured in the image data, the peep hole device may log as a door opening event. In some examples, the motion sensor may detect a door opening event based on motion data received from the motion sensor when the door is swung open and closed.

The front portion of the peep hole device may include one or more other sensors. For example the front portion of the peep hole device may include a sound sensor that is configured to detect the sound generated when a visitor knocks on the front door. In these examples, the camera may be configured to initiate the capture of image data when the sound sensor detects sound indicating that a visitor is knocking on the front door.

The second portion of the peep hole device may be mounted to an interior side of the front door of the monitored property. For example, the second portion is configured to stick to the surface of the interior of the front door over the original peep hole. The second portion may be rectangular in shape. For example, the second portion may be shaped and sized similar to the first portion. Similar to the first portion, the second portion of the peep hole device may include an adhesive material at the corners of the second portion. When the peep hole device is being set up, the user may remove a protective strip over the adhesive material, and place the second portion on the surface of the interior of the front door. In other examples, the resident of the property may use double-sided tape to adhere the second portion of the device to the surface of the interior portion of the front door. In yet another example, the second portion of the device may include one or more screws that each screw into the surface of the interior of the front door. In other examples, the second portion may include a shallow screw that screws into the threading of the existing peep hole in the door. The screw may connect to a complimentary screw on the first portion and secure the first and second portion of the peep hole device to the front door. In these examples, the wires may run through a hollow pert of the screw connecting the first portion and the second portion. In some examples, the second portion of the device includes a magnetic strip, that may be used to mount the second portion of the device when the front door is metal.

The second portion of the peep hole device may include a wireless radio that is configured to communicate with a monitoring control unit at the monitored property. For example, the second portion of the peep hole device may include a Bluetooth radio. In other examples, the second portion includes a cellular radio, a Wi-Fi radio, or any other suitable communication radio. The second portion of the peep hole device may include a display unit. For example, the second portion of the peep hole device includes an LCD screen as a display unit. The display unit may be configured to display the image data captured by the camera of the first portion.

The peep hole device may include a connection portion that is configured to connect the first portion to the second portion through a hole in the surface of the front door. For example, the connecting portion may be a flexible cylindrical tube with a diameter that is smaller than the diameter of hole in the surface of the front door. The hole in the surface of the front door may the original peep hole of the door. A user may remove the glass that covers the peep hole to thread the connecting portion through the hole. The connecting portion may be configured to house an electrical connection between the first portion and the second portion, and may be removably connected to the first portion and the second portion. For example, the connecting portion may be a pluggable wire.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system comprising:
    a monitoring control unit that is in communication with an electronic peep hole device;
    wherein the electronic peep hole device comprises:
        a first portion that is configured to be removably mounted to an exterior side of a front door of a monitored property, the first portion including a user interface with a door bell button, a motion sensor, a sound sensor, and a camera that includes a light sensitive sensor, and that is configured to capture image data in response to the light sensitive sensor detecting a human form object in a vicinity of the front door of the property before the image data is captured, and the sound sensor determining that a sound indicates knocking on the front door, wherein the first portion is mounted over a hole in a surface of the door;
        a second portion that is configured to be removably mounted to an interior side of the front door of the monitored property, the second portion including a display unit that is configured to display the image data captured by the camera, wherein the second portion is mounted over the hole in the surface of the door; and a connecting portion that is configured to connect the first portion to the second portion through the hole in the surface of the front door, the connecting portion being configured to house a removably pluggable electrical connection between the first portion and the second portion, wherein the camera that includes the light sensitive sensor is configured to:
compare the image data to stored image data of a known visitor;
based on comparing the image data to the stored image data of the known visitor, determine that the human form object in the vicinity of the front door is the known visitor;
based on determining that the human form object in the vicinity of the front door is the known visitor, communicate with the monitoring control unit to allow the known visitor access to the property; and
based on communicating with the monitoring control unit to allow the known visitor access to the property, detect and store in memory, a front door opening event.

2. The system of claim 1, wherein:
the camera that includes the light sensitive sensor, and is located in the first portion of the electronic peep hole device includes a processor, and is configured to capture image data in response to a visitor pressing a door bell button of the device.

3. The system of claim 1, wherein:
the camera that includes the light sensitive sensor, and is located in the first portion of the electronic peep hole device includes a processor, and is configured to capture image data in response to detecting motion in the vicinity of the front door of the property.

4. The system of claim 1, wherein the user interface of the first portion of the electronic peep hole device includes a keypad, a microphone, and a speaker, and wherein the keypad, the microphone, and the speaker are each in communication with the monitoring control unit.

5. The system of claim 4, wherein the microphone of the electronic peep hole device is configured to receive voice data from a visitor in the vicinity of the front door of the property.

6. The system of claim 1, wherein at least one of the first portion of the electronic peep hole device and the second portion of the electronic peep hole device includes a battery that is configured to power the electronic peep hole device.

7. The system of claim 1, wherein the second portion of the electronic peep hole device includes a wireless radio that is configured to transmit one or more of a short wave communication, a cellular communication, or a Wi-Fi communication, and that is in communication with the monitoring control unit.

8. The system of claim 1, wherein the first portion of the electronic peep hole device is configured to adhere to the surface of the exterior of the front door.

9. The system of claim 1, wherein:
the first portion of the electronic peep hole device includes a vibration sensor that is configured to detect a sequence of knocks on the front door of the property; and
the camera that includes the light sensitive sensor, and is located in the first portion of the electronic peep hole device is configured to capture image data in response to detecting the sequence of knocks on the front door of the property.

10. The system of claim 1, wherein the second portion of the electronic peep hole device includes a second camera, and wherein the second camera is in communication with the monitoring control unit.

11. The system of claim 1, wherein the second portion of the electronic peep hole device is configured to adhere to the surface of the interior of the front door.

12. The system of claim 1, wherein the connecting portion of the electronic peep hole device is a flexible cylindrical tube that is removably coupled to each of the first portion and the second portion of the electronic peep hole device.

13. The system of claim 1, wherein each of the first portion and the second portion of the electronic peep hole device are mounted over the hole in the surface of the door by a spring based system that is configured to removably secure the first portion and the second portion of the electronic peep hole device to the surface of the front door.

14. The system of claim 1, wherein each of the first portion and the second portion of the electronic peep hole device are mounted over the hole in the surface of the door by a removably adhesive material.

15. The system of claim 14, wherein the removably adhesive material is double sided tape.

16. The system of claim 1, wherein the camera that includes the light sensitive sensor, and that is located in the first portion of the electronic peep hole device, is configured to:
capture second image data:
based on capturing second image data, compare the second image data to the image data of the known visitor;
based on comparing the second image data to the image data of the known visitor, determine that the known visitor exited the monitored property; and
based on determining that the known visitor exited the monitored property, communicate with an electronic device of a resident of the property indicating that the known visitor exited the property.

17. The system of claim 1, wherein the camera that includes the light sensitive sensor, and that is located in the first portion of the electronic peep hole device, is configured to count a number of known visitors that access the monitored property between a particular time period.

18. The system of claim 1, wherein a motion sensor that is located on the first portion of the electronic peep hole device is configured to determine when the front door is opened and or closed.

19. A monitoring system comprising:
a monitoring control unit that is in communication with an electronic peep hole device;
wherein the electronic peep hole device comprises:
a first portion that is configured to be removably mounted to an exterior side of a front door of a monitored property by a spring based system, the first portion including a user interface with a door bell button, a motion sensor, a sound sensor, and a camera that includes a light sensitive sensor, and that is configured to capture image data in response to detecting a human form object in the vicinity of the front door of the property before the image data is captured, wherein the first portion is mounted over a hole in a surface of the door, and wherein the camera is further configured to detect when the front door is in an opened position based on detecting a change in a view of the captured image data;
a second portion that is configured to be removably mounted to an interior side of the front door of the monitored property by the spring based system, the second portion including a display unit that is configured to display the image data captured by the camera, wherein the second portion is mounted over the hole in the surface of the door, and held into position by the spring based system; and a connecting portion that is configured to connect the first portion to the second portion through the hole in the surface of the front door, the connecting portion being configured to house a removably pluggable electrical connection between the first portion and the second portion, and wherein the connecting portion is a flexible cylindrical tube that is removably coupled to each of the first portion and the second portion, wherein the camera is configured to:

compare the image data to stored image data of a known visitor;

based on comparing the image data to the stored image data of the known visitor, determine that the human form object in the vicinity of the front door is the known visitor;

based on determining that the human form object in the vicinity of the front door is the known visitor, communicate with the monitoring control unit to allow the known visitor access to the property;

based on communicating with the monitoring control unit to allow the known visitor access to the property, capture second image data;

based on capturing second image data, compare the image data to the second image data and determine a change in a view of the second image data;

based on determining a change in the view of the second image data, determine that the front door is in an opened position; and based on determining that the front door is in an opened position, store a time for a door opening event.

* * * * *